US007263377B1

United States Patent
Wahlstrom et al.

(10) Patent No.: US 7,263,377 B1
(45) Date of Patent: Aug. 28, 2007

(54) SYSTEM AND METHOD OF ASSIGNING PRIORITY TO REMOTE UNITS IN A COLLISION FREE MULTIPLE ACCESS PROTOCOL

(75) Inventors: Donald P. Wahlstrom, Woodinville, WA (US); Praveen Mehrotra, Fresno, CA (US)

(73) Assignee: Cingular Wireless II, LLC, Atlanta, GA (US)

( * ) Notice: Subject to any disclaimer, the term of this patent is extended or adjusted under 35 U.S.C. 154(b) by 769 days.

(21) Appl. No.: 10/627,192

(22) Filed: Jul. 24, 2003
(Under 37 CFR 1.47)

Related U.S. Application Data (60) Provisional application No. 60/399,042, filed on Jul. 25, 2002.

(51) Int. Cl.
*H04Q 7/20* (2006.01)
*H04Q 7/00* (2006.01)
*H04Q 7/24* (2006.01)
*H04M 1/00* (2006.01)
*H04B 1/38* (2006.01)

(52) U.S. Cl. ............... 455/512; 455/550.1; 455/556.2; 455/509; 455/561; 455/435.3; 370/328; 370/329; 370/338

(58) Field of Classification Search ........ 370/328–345, 370/461–462, 395.42, 436–449, 203–210, 370/322, 458, 347–349, 430–432, 464, 485, 370/910, 229–230, 280–281, 294–295; 455/41.2, 455/45, 403, 415, 422.1, 423, 450, 426.2, 455/512–513, 560–561, 435.1–435.3, 462–466, 455/550.1, 556.2, 509, 515–517, 448, 453, 455/702; 709/203, 207, 226, 228, 240
See application file for complete search history.

(56) References Cited

U.S. PATENT DOCUMENTS 6,404,756 B1 * 6/2002 Whitehill et al. ........... 370/338

(Continued)

OTHER PUBLICATIONS

"Fixed wireless access/wireless local loop technology—Background;" http://florin.stanford.edu/~t361/Fall2000/ABakrie/Home.htm, downloaded from the internet on Feb. 27, 2002, 2 pages.
"Fixed wireless access/wireless local loop technology—How does a WLL system work?," http://florin.stanford.edu/~t361/Fall2000/ABakrie/How WLLworks.htm, downloaded from the internet on Feb. 27, 2002, 2 pages.
"Token passing:IEEE802.5 standard," The Data Link Layer, http://www-net.cs.umass.edu/cs653-1997/notes/ch7/ch7-2.htm, downloaded from the internet on Dec. 3, 2001, 7 pages.

*Primary Examiner*—Meless N. Zewdu
(74) *Attorney, Agent, or Firm*—Woodcock Washburn LLP (57) ABSTRACT

Disclosed embodiments include a system and method for prioritizing access requests from a plurality of remote units, wherein the access requests are requests for uplink access in a fixed wireless network. In one embodiment, the system receives an access request from at least two remote units. The system also receives a priority request from the remote units, which may be separate or related to the access requests. The system analyzes the access requests based on the priority requests and determines which remote units will be granted uplink access to the network. The system then transmits an indication of at least one remote unit that is allowed to transmit on an uplink channel. In one embodiment, the access request and priority request are encompassed within two or more tones transmitted from a remote unit. Many other alternatives and alternative embodiments are also disclosed.

28 Claims, 5 Drawing Sheets

U.S. PATENT DOCUMENTS 6,577,630 B1 * 6/2003 Markwalter et al. ........ 370/392
6,671,284 B1 * 12/2003 Yonge, III et al. .......... 370/462
6,751,444 B1 * 6/2004 Meiyappan .................. 455/69
6,842,460 B1 * 1/2005 Olkkonen et al. .......... 370/465
6,891,810 B2 * 5/2005 Struhsaker et al. ......... 370/294
6,967,937 B1 * 11/2005 Gormley ..................... 370/330

* cited by examiner

SYSTEM AND METHOD OF ASSIGNING PRIORITY TO REMOTE UNITS IN A COLLISION FREE MULTIPLE ACCESS PROTOCOL

CROSS-REFERENCE TO RELATED APPLICATION(S)

This application claims priority to U.S. Provisional Patent Application No. 60/399,042 filed Jul. 25, 2002, incorporated herein by reference.

BACKGROUND

Embodiments of the invention relate generally to devices and methods for assigning priority to messages or transmissions in a network.

The need and desire for users, such as consumers, single home small office (SOHO) users, small businesses, etc., for telecommunications services continues to increase dramatically. Users desire faster Internet connections, facsimile service, telephone service, etc., in order to take advantage of the connectivity that each of these services provides. In response, many telecommunications companies have created a large amount of bandwidth capacity on long-haul transmission routes (the backbone network infrastructure) through the use of fiber-optic networks, which can transmit data at speeds in excess of 10 gigabytes per second (Gbps). A disconnect exists, however, between the backbone networks and the local loops of local exchange carriers. The connection between the local exchange carriers and the end users, particularly smaller users, is still mostly twisted pair copper cable instead of high-speed fiber-optic cable. This failure to provide high-speed connections for "the last mile" has resulted in a bandwidth bottleneck between the increasing data needs of users and the high-speed backbone network.

One solution to this bottleneck is to lay high-speed fiber-optic cable directly out to individual users. This solution is both very expensive and slow to implement. Another solution is to utilize existing telephone lines, such as with DSL or other high-speed connections. These solutions, however, are generally expensive and have upper physical limits on their bandwidth capacity.

Another solution to the bottleneck is to utilize wireless telephony. Wireless telephony provides voice data links between users of mobile devices and fixed devices on a network. It gives users using a wireless phone or other wireless device mobility without regard to how they are actually connected to the network. This is done by providing access points or base station units that can hand off the connections of mobile devices without interruption of the service. 2G (second-generation) digital mobile phone service such as the Global System for Mobile Communications (GSM), EIA/TIA-136 Time Division Multiple Access (TDMA), TIA-IS-95 Code Division Multiple Access (CDMA), and the AMPS (analog mobile phone service) are examples of such telephone networks. Wireless telephony, however, is plagued by limited bandwidth, which is particularly problematic for higher bandwidth applications such as use of the Internet.

A more recent solution to the bottleneck problem is a fixed wireless network, which may also be known as a wireless local loop (WLL). Fixed wireless networks are the infrastructure used to provide radio (microwave) transmissions between two or more stationary points. Fixed wireless networks can provide high-speed, highly reliable connections between users and a high-speed backbone network, bypassing the "last mile" bottleneck using a broadband wireless connection. The fixed wireless network is generally built around a number of radio base stations (bases), each connected by microwave, coaxial cable or fiber-optic backhauls to one or more central office switches. The base is connected to each user remote units (RU) via a radio link. Each RU would have a directional antenna aimed directly at the base and attached outside their building. The fixed wireless network therefore creates a link between RU's and the backbone network via a base, allowing access to the Internet, a public switched telephone network (PSTN), etc.

One problem with fixed wireless networks is that as the number of users increase for each base, the current protocols become increasingly inefficient because of collisions between RU's accessing upstream channels and resulting "backoffs". Current systems implement a Carrier Sense Multiple Access with Collision Detection (CSMA/CD) protocol. In the CSMA/CD protocol, all devices attached to a network listen for transmissions in progress before starting to transmit. If two or more devices begin transmitting at the same time and their transmissions "crash" into each other, each "backs off" before again attempting to transmit. While the CSMA/CD protocol does allow for multiple RU's accessing a single channel, the number of backoffs, and thus the inefficiencies and delays, increase as the number of RU's increase.

Another problem with existing fixed wireless networks is that current protocols do not provide any method for differentiating between RU's with respect to their priority. For example, higher priority RU's may collide with lower priority RU's and be delayed for an unacceptably long time.

Expense, inconvenience, and problems with scalability plague current solutions to the problem of the "last mile". Users and telecommunication providers alike continue to seek a more efficient and effective ways of providing telecommunications services to users without direct access to a high-speed backbone.

In the drawings, the same reference numbers identify identical or substantially similar elements or acts. To easily identify the discussion of any particular element or act, the most significant digit or digits in a reference number refer to the Figure number in which that element is first introduced, e.g., element 102 is first introduced and discussed with respect to FIG. 1.

Note that the headings provided herein are for convenience and do not necessarily affect the scope or interpretation of the invention.

DETAILED DESCRIPTION

Disclosed embodiments include a system and method for prioritizing access requests from a plurality of remote units, wherein the access requests are requests for uplink access in a fixed wireless network. In one embodiment, the system receives an access request from at least two remote units. The system also receives a priority request from the remote units, which may be separate or related to the access requests. The system analyzes the access requests based on the priority requests and determines which remote units will be granted uplink access to the network. The system also may prioritize the access requests based on the received priority requests. The system then transmits an indication of at least one remote unit that is allowed to transmit on an uplink channel.

In one embodiment, the access request and priority request are encompassed within two or more tones transmitted from a remote unit. By utilizing tones transmitted from the remote units, there is significant flexibility in assigning priority levels to access requests. For example, if two tones are used, four different priority levels may be defined based on the 'on' and 'off' states of the tones. This allows fixed network providers to divide remote units, user devices, or other items through four different levels of priority. In an alternative embodiment, only three different priority levels are defined and the fourth alternative (such as two 'null' tones) may represent the situation when no access is requested. The system and method are also scalable, so that if additional tones are used, many more potential levels of priority are possible. Many other alternatives and alternative embodiments are also disclosed.

The following description provides specific details for a thorough understanding of, and an enabling description of, embodiments of the invention. However, one skilled in the art will understand that the invention may be practiced without these details. In other instances, well known structures and functions have not been shown or described in detail to avoid unnecessarily obscuring the description of the embodiments of the invention.

Figure 1:
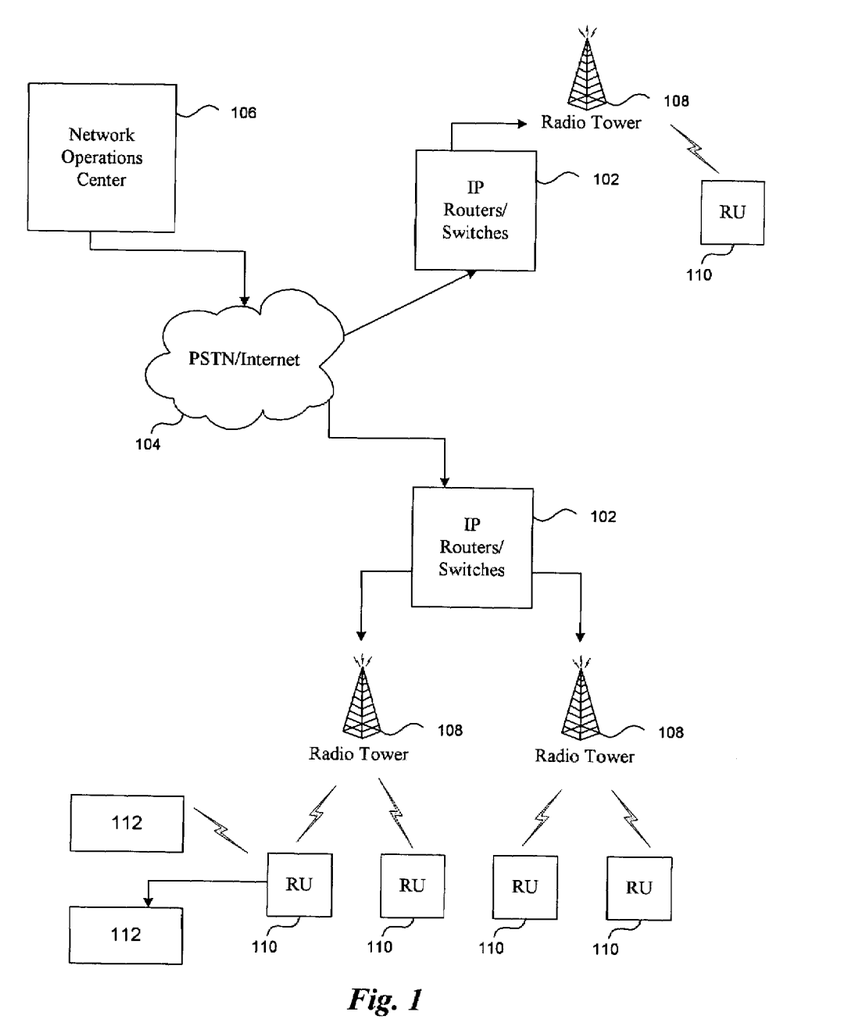
FIG. 1 shows a block diagram of a fixed wireless network in a suitable environment in one embodiment of the invention.

FIG. 1 shows a block diagram of a fixed wireless network in a suitable environment in one embodiment of the invention. Fixed wireless networks, also known as wireless local loops (WLL), are the infrastructure used to provide radio (microwave) transmissions between two or more stationary points and may be used to provide a connection between users and a high-speed backbone network. Fixed wireless networks are typically based upon the use of the 24 Ghz to 38 Ghz electromagnetic spectrum. Fixed wireless networks involve transmitting voice and data signals over the assigned frequencies, which allows the information to be transmitted at fiber-optic speeds while avoiding the limitations of local, copper-based networks.

In FIG. 1, one or more bases 108 are in communication with a network 104, such as a public switched telephone network (PSTN) and/or the Internet, via IP routers/switches 102. The bases 108 may be in communication with the network 104 or IP routers/switches 102 via any means, such as fiber-optic cable, wireless communications, microwave, radio, infrared, coaxial cable, etc. The IP routers/switches 102 may include IP routers that provide data connectivity to the Internet (e.g., packet data), switches for telephony services that mimic traditional wired connections, or other items that provide connectivity with other networks. In an alternate embodiment, the base 108 is in communication with the network 104 directly, via a mobile switching center, or via any other facilities or methods.

Each base 108 may be in wireless communication with one or more remote units (RU's) 110 via a radio (microwave) link. In one embodiment, the link is a millimeter radio link. In some embodiments, the RU's 110 may be 40 kilometers or more from the base 108. Each RU 110, in turn, may be in communication with one or more user devices 112. RU's 110 typically include a directional antenna aimed directly at the base (and usually attached outside the building) to allow wireless communications between the RU 110 and a base 108. User devices 112 may include personal computers, fax machines, set top boxes, televisions, telephones, personal data assistants, household appliances, laptop computers, or any other devices, and may be in communication with the RU 110 via a wired connection, wireless connection, radio link, microwave link, infrared link, wireless protocol such as Bluetooth, cables, etc. In one embodiment, an RU 110 will aggregate the telephone and data lines attached to each user device 112 associated with it, transform the information to the appropriate frequency, and transmit this information to the base 108 (and perform the opposite procedure when the information is received). The network operations center 106 performs various administrative tasks for the fixed wireless network, such as control of bases 108, network traffic management, activation and deactivation of lines and services, etc. One skilled in the art will recognize that many alternative configurations are possible and all are within the scope of the invention.

Unless described otherwise below, the construction and operation of the various blocks shown in FIG. 1 and the other Figures are of conventional design. As a result, such blocks need not be described in further detail beyond that provided herein, because they will be understood by those skilled in the relevant art. Such further detail is omitted for brevity and so as not to obscure the detailed description of the invention. Any modifications necessary to the blocks in FIG. 1 (or other Figures and embodiments) can be readily made by one skilled in the relevant art based on the detailed description provided herein.

Figure 2:
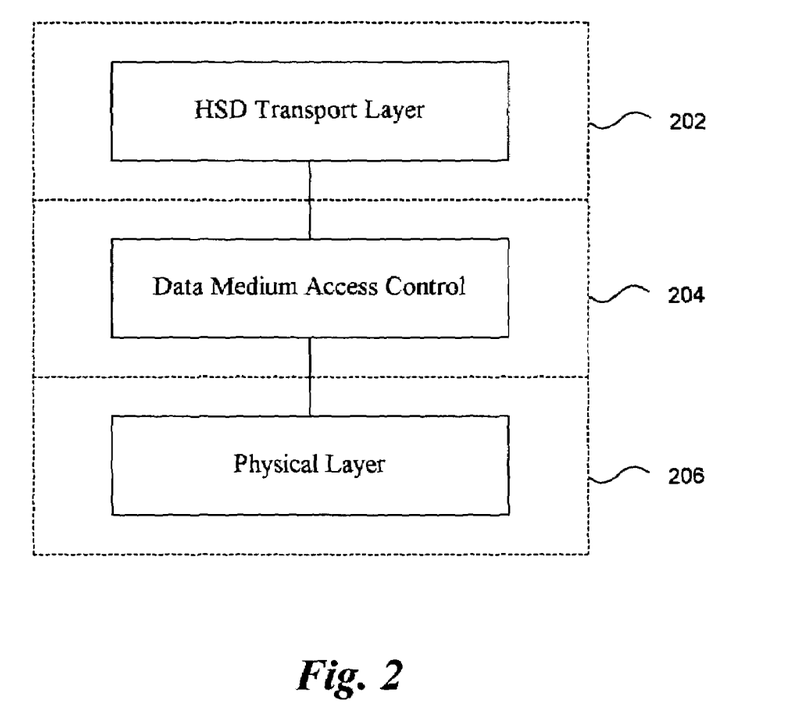
FIG. 2 is a block diagram that illustrates components of a fixed wireless interface in one embodiment of the invention.

FIG. 2 is a block diagram that illustrates components of a fixed wireless interface in one embodiment. In this embodiment, details of a collision-free multiple access (CFMA) protocol are discussed. Using a CFMA protocol, multiple RU's 110 may access one single medium simultaneously. The CFMA protocol is collision-free, as each RU 110 has a reserved time slot or channel, preventing collisions and the resulting delays and/or backoffs, even though multiple RU's 110 may simultaneously access the communications medium. CFMA protocols enable better sharing of upstream channels among multiple RU's 110 and improve the channel utilization when compared to CSMA/CD-based protocols or other collision-based protocols.

In the CFMA protocol, all RU's 110 first send a channel access request to a controlling entity, which then one-by-one lets all RU's 110 transmit data. Hence, it uses a reservation-based approach, where if any RU 110 has data to send, it must first send a request to a controlling entity to reserve resources for it.

The controlling entity governs the reservation and transmission procedures, which may be accomplished by alternating between reservation and transmission states. In the reservation state (or arbitration state), RU's 110 send access requests to the base 108 (as the controlling entity) whenever the RU's 110 have data that needs to be transmitted. The controlling entity will collect the access requests and decide which RU's 110 may transmit information. In the transmission state, the RU's 110 that have been granted access transmit information to the base 108.

In the embodiment of FIG. 2, the fixed wireless interface includes three layers of a CFMA protocol that are communicated between the base 108 and the RU 110. The three layers are the high speed data (HSD) transport layer (HTL) 202, the data medium access control (DMAC) layer 204, and the physical layer 206. Both the RU's 110 and the base 108 include all three layers. The DMAC layer 204 is actually part of a larger medium access control (MAC) layer that also includes a similar voice MAC (VMAC) layer. Generally speaking, the DMAC layer 204 provides HSD access control services for the airlink between a base 108 and RU's 110. The DMAC layer 204 enables a group of RU's 110 to access a single base 108 via a CFMA protocol. To enable this function, the DMAC communicates with the layers above and below it, namely the HTL 202 and the physical layer 206. The DMAC layer 204 provides service to the HTL 202 to convey information across the airlink to other peers (such as a base 108, other RU's 110, etc.). The DMAC layer 204 uses the services provided by the physical layer 206 via services for medium access control, channel insertion, error correction encoding, and frame recognition and encoding in order to serve the HTL 202. The physical layer 206 provides the functionality of transmitting and receiving bits over the airlink in both directions. In the downlink, the physical layer 206 also carries the HCC channel.

Data passing between the DMAC layer 204 and the HTL 202 experiences periods of blocking and unblocking depending on the amount of buffer space available at the DMAC layer 204. Moreover, because uplink resources are typically limited, the RU DMAC layer 204 may have to wait some time before it is granted access to the uplink. Simultaneously, the RU DMAC layer 204 may be receiving DMAC frames from the HTL layer 202. DMAC frames are the unit of data exchanged between the DMAC layer 204 and the HTL 202. The HTL 202 segments its payload into multiple frames, which are then passed to the DMAC layer 204 for transmission to another entity. The RU DMAC layer 204 sends an access request to the base 108 only when it receives at least one DMAC frame from the HTL 202.

The HTL 202 requests the DMAC layer 204 to transport data (in the form of HTL frames) to another entity. The DMAC layer 204, upon receiving the frames, further segments them into smaller blocks. The DMAC 204 also appends a header called a DMAC header to the first block of data. The blocks are then encoded and the resulting group of encoded blocks is called a DMAC frame. Each encoded block is referred to as an Encoded DMAC Frame Segment (EDFS). The number of data bits carried in each EDFS may vary. The first EDFS carries a DMAC header called a Data Access Burst (DAB).

The physical layer 206 provides the functionality of transmitting and receiving bits over the airlink in both directions to the DMAC layer 204. In one embodiment, the physical layer 206 utilizes time division multiple access (TDMA) technology to allocate a discrete amount of frequency bandwidth and a specific transmission timeslot so that numerous RU's 110 may use the same channel. In this embodiment, the TDMA frame consists of 20 time-slots and its total duration is 7.5 msec. Out of these 20 slots, 18 can be potentially used as HSD slots to carry HSD. Each HSD slot may carry eight (8) data units (DU's), each of which may include 72 tones. Tones are audio signals consisting of one or more superimposed amplitude modulated frequencies with a distinct cadence and duration. In the current system, one tone is typically used for indicating an access request, so that if the tone is above a certain threshold, it is an indication that an RU 110 is attempting an access request.

Figure 3:
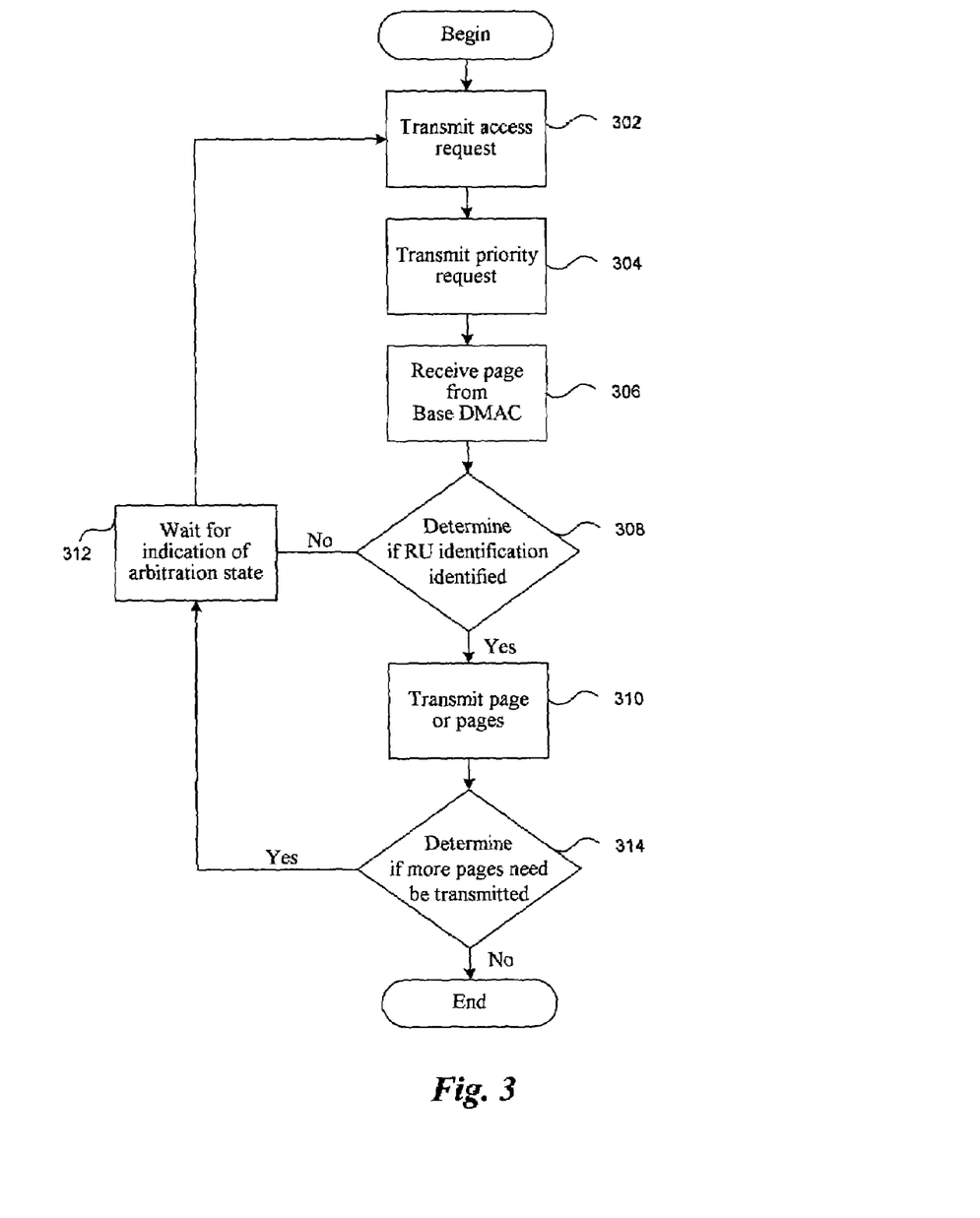
FIG. 3 is a flowchart depicting the receipt and transmission of data by a remote unit in one embodiment of the invention.

FIG. 3 is a flowchart depicting the receipt and transmission of data by an RU 110 in one embodiment of the invention. The receipt and transmission of data described in FIG. 3 is used by an RU 110 when communication with a base 108 (and thus other networks or network resources) is desired. In block 302, the RU 110 transmits an access request to a base 108. In one embodiment, the RU 110 may only transmit an access request while the base 108 is in the appropriate state. In this embodiment, the two states defined for DMAC layer 204 entities at an RU 110 and the base 108 are the reservation state (also known as the "arbitration state") and the transmission state. The base 108 indicates the current state to all RU's 110 and acts as the controlling entity. In the arbitration state, RU's 110 may send access requests to the base 108. The RU 110 will send an access request whenever there is one or more pending DMAC frames (e.g., there is pending data in its buffer to be transmitted) and the DMAC layer 204 is in the arbitration state.

In one embodiment, the access request is transmitted by the RU DMAC layer 204. In this embodiment, access requests by different RU's 110 are transmitted orthogonal to each other so as to prevent any collisions of data. One skilled in the art will recognize that many other ways of prevent data collisions are available and within the scope of the invention.

The function continues in block 304, where the RU 110 transmits a priority request (also known as a quality of service request). In one embodiment, the priority request mechanism is implemented in conjunction with the access request of block 302. To implement the priority request mechanism along with the access request, each RU 110 may be assigned two (2) unique Orthogonal Frequency Division Multiplexing (OFDM) tones, which may be carried in a DU. These tones are used as energy bursts. If the base 108 detects energy over a threshold, the RU 110 is assumed to be transmitting a '1' over that tone. With two tones, there are four possible levels, which may be assigned as follows in one embodiment:

00: Indicates there is no access request by RU 110 (Null Priority)

01: Access Request by RU 110 with Priority 1 (Lowest Priority)

10: Access Request by RU 110 with Priority 2 (Medium Priority)

11: Access Request by RU 110 with Priority 3 (Highest Priority)

This differs from previous systems where one tone was to used indicate whether an access request was being made. One skilled in the art will recognize that other alternative configurations of levels are possible and within the scope of the invention. For example, in one alternative embodiment, only three different priority levels are defined and the fourth alternative (such as two 'null' tones) may represent the situation when no access is requested. One skilled in the art will also recognize that the priority request mechanism may be scaled up to generate additional levels and combinations. For example, three tones will result in eight possible levels, four tones will result in sixteen possible levels, etc.

In one embodiment, the tones are configured during initialization of the RU 110. The tones could be downloaded or otherwise transferred to the RU 110. For example, tones could be associated with a type of RU 110. In this embodiment, a fax machine, for example, could have the highest priority because most fax protocols are intolerant to transmission interruptions or time lags between received frames of data. A personal computer and wireless phone may have medium or "standard" priority because such devices are commonly used. A set top box could have the lowest priority because delays are more acceptable with this device than others.

Many methodologies can be used to assign priorities to RU's 110, such as by RU 110 type, type of user device associated with the RU 110, geographical area, level of service requested, type of signal (e.g., emergency message), identity of user, time of day, etc. In another embodiment, the type of application may be used to assign priorities. For example, an application such as IP/OAM&P may be given higher priority than, say, a channel guide on a set-top box. As another example, a user could pay a premium monthly rate so that all transmissions to or from the user's devices are at the highest priority. Other priority levels and corresponding rate structures are possible. Thus, a service provider may provide differing levels of service at different rate structures.

In another alternative embodiment, the tones could be downloaded by a user of an RU 110 after initialization. For example, the user could purchase an upgrade of service that entitles them to higher priority service and download the appropriate tones or other authorization to an RU 110 or user device.

In another alternative embodiment, the RU 110 could be a router, switch or some other multi-port network element. In this embodiment, the device could determine what the requesting user device was (such as a fax machine, PC, etc.) and determine what priority to assign to that device. The RU 110 could then associate the appropriate tones for transmissions to and from that user device. The RU 110 could use a look-up table to determine the priority of a user device, it could receive an indication of priority from the user device, etc.

The function continues in block 308, where the RU 110 receives a DMAC frame from the base 108. In one embodiment, the DMAC frame will contain information about which state the base 108 is in and which RU's 110 may transmit. In block 308, the function determines if the RU 110 is identified in the DMAC frame, such as by an RU identification. In its transmission state, a base 108 sends an identification of one or more RU's 110 which may send data in the next uplink frame in the form of an RU identification. In this embodiment, the RU identification would be transmitted in the HCC channel. In one alternative embodiment, the function may also determine the amount of data that the base 108 is allowing it to transmit, such as allowing some RU's 110 to transmit multiple frames. If the RU 110 determines that its RU identification has been transmitted, such as by seeing the RU identification in the HCC channel, the function continues to block 310 where the RU 110 transmits its data. In one embodiment, the RU 110 may transmit an EDFS in the same HSD time-slot in which the transmit command was received in a previous downlink frame. In this fashion, the RU 110 transmits over a reserved time and slot so as to prevent data collisions. If the function determines in block 308 that the RU identification was not received, then the function continues to block 312, where the RU 110 waits for an indication of an arbitration state from the base 108 so that it can again transmit an access request in block 302.

In block 314, the function determines if more pages or data need be transmitted. If no additional pages or data need be transmitted, the function terminates, and if pages or data still need to be transmitted, the function continues to block 312 to wait for an arbitration state so that the RU 110 may arbitrate for an uplink channel.

Figure 4:
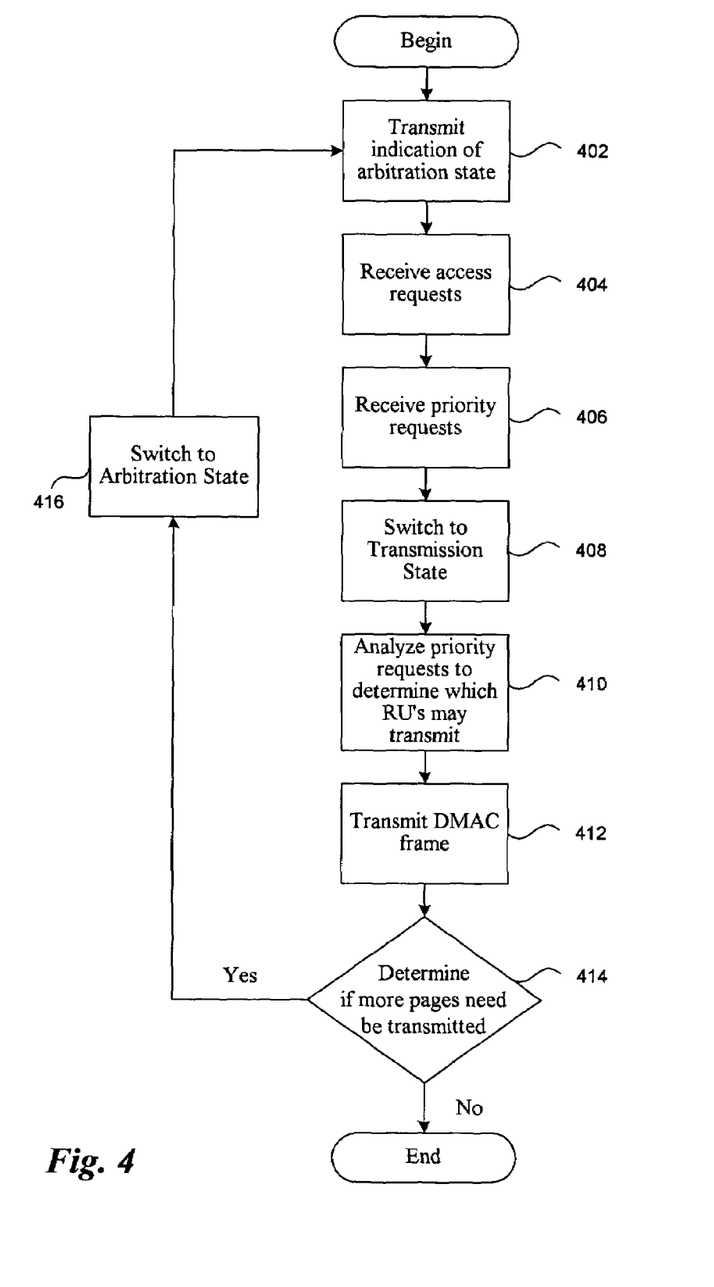
FIG. 4 is a flowchart depicting the receipt and transmission of data by a base in the embodiment of FIG. 3.

FIG. 4 is a flowchart depicting the receipt and transmission of data by a base 108 in the embodiment of FIG. 3. In block 402, the function transmits an indication of the arbitration state. In its role as controlling entity, the base 108 is also responsible for access control. Access control is used to facilitate and organize transmission over the airlink (which includes uplink and downlink). In the uplink direction (from RU 110 to base 108), access control is required to enable multiple RU's 110 to share the common transmission resources. Access control is not necessary for the downlink direction as only one entity, the base 108, is transmitting. The DMAC layer 204 implements access control using a reservation-MAC based mechanism in the uplink direction, as described earlier.

The function continues in block 404, where the function receives access requests from one or more RU's 110. To manage large numbers of RU's 110 serviced by a single base 108, a set of RU's 110 are assigned to an arbitration group number (AGN). The base 108 maintains a separate protocol state for each AGN and during the arbitration state the base 108 sends the AGN number over the HCC channel in a downlink frame. RU's 110 assigned to that AGN see their AGN identification and transmit arbitration tones, typically in the next TDMA frame. The AGN identification serves as an indication that the RU 110 should arbitrate. In block 406, the function also receives priority requests from one or more RU's 110. In one embodiment, the priority request tones are transmitted in conjunction with the access request tones (which may be equivalent to arbitration tones). Each RU 110 may send an arbitration signal that includes both a request to transmit data, the arbitration tones, and a request for a priority level of service, the priority request tones. These two tones may be combined together so that, for example, two tones indicate both the priority request and the access request.

If one or more RU's 110 send access requests, the base 108 changes over to the transmission state in block 408. In one embodiment, some RU's 110 may be in arbitration state while others are in transmission state, such as when different AGN numbers are treated differently.

The function continues in block 410 where, while in the transmission state, the base DMAC layer 204 implements a frame scheduling mechanism to analyze priority level request and other information to determine which RU's 110 will be allowed to transmit. In one embodiment, parameters for use in the scheduling decision are the desired priority requested by each RU 110, the total number of RU's 110 which have sent access requests, the pending number of DMAC frames at each RU 110, etc. The output of the scheduler includes the sequence in which RU's 110 get access to upstream channel and the number of DMAC frames each RU 110 gets to transmit.

In block 412, the function transmits the DMAC frame to the RU's 110, where the DMAC frame includes an indication of which RU's 110 may transmit data in the next uplink frame and how many frames each RU 110 may transmit. The function continues in block 414, where the function determines if more information need be transmitted, such as when there are access requests that have resulted in a grant of permission to transmit. If the function determines that the answer is no, the function terminates, but if more information needs to be transmitted, the function continues to block 416. In block 416, the base 108 switches to an arbitration state to again allow RU's 110 to arbitrate for the uplink channel.

Figure 5:
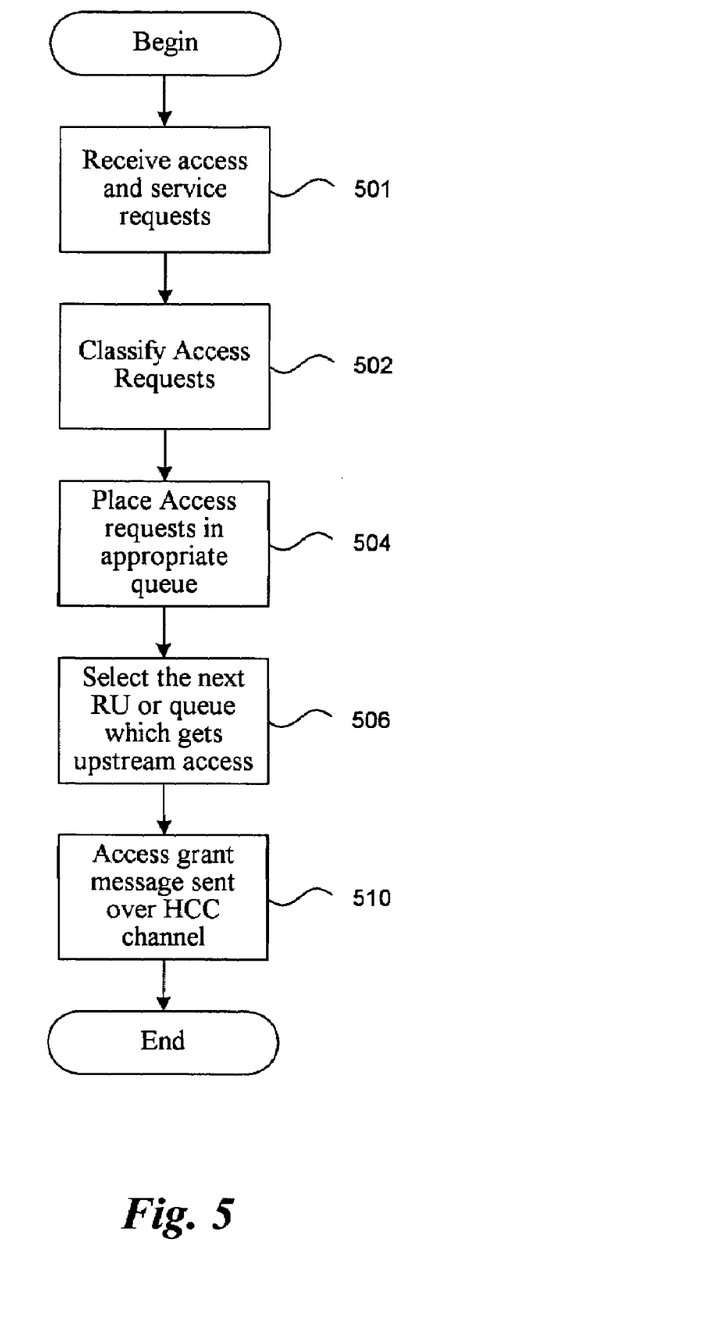
FIG. 5 is a flowchart depicting the processing of access and priority requests in one embodiment of the invention.

FIG. 5 is a flowchart depicting the processing of access and priority requests in one embodiment of the invention.

The function of FIG. 5 may represent, at least in part, the analysis of block 410 in FIG. 4. In block 501, the function receives access requests and priority requests, which combines the function of blocks 404 and 406 in FIG. 4. The function continues in block 502, where the function classifies all of the incoming access requests into priority queues. In one embodiment, the function classifies all of the incoming access requests from all AGN groups that are in an arbitration state. The priority queues are maintained for each requested level of priority and the classification may be done on the basis of arbitration tones transmitted by RU's 110. In the embodiment including two priority tones within the arbitration tones, three queues are maintained, one for each priority level. A queue need not be maintained for RU's 110 that are not requesting access (e.g., a "0" for the priority tones).

In block 506, the function selects the next RU 110 to be granted upstream channel access from the queues. The selection criterion depends on the scheduling algorithm implemented. There are many possible implementations to handle prioritized requests. In one implementation, the scheduler grants an upstream channel to all high priority RU's 110 first and lets them transmit the requested number of DMAC frames, then lets lower-priority RU's 110 transmit one frame. In another implementation, the scheduler services higher priority RU's 110 as described above but while servicing lower-priority RU's 110 grants access to a limited number of RU's 110 only, then returns to an arbitration state to let higher priority RU's 110 arbitrate again. This will ensure a minimal service rate to higher-priority RU's 110 if there is large number of lower-priority RU's, but may result in starvation of lower-priority RU's.

The function continues in block 510, where the access grant message is sent over the HCC channel in the next DMAC frame. In one embodiment, the access grant message may be any indication of which RU's 110 have been granted access, including an RU identification.

The system and method for incorporating a priority request with an access request provides a number of benefits. For example, by providing the capability of making a priority request, network traffic can be optimized. Higher priority traffic can be given the highest priority for limited bandwidth. Priority may be based on the RU's 110, user device, type of data, etc., giving great flexibility in designing an efficient and effective fixed wireless architecture. As another benefit, users of the service can be given higher priority service for a higher cost, providing an additional revenue source. This also allows users only to pay for the level of service they need, optimizing the use of the user's resources as well. These are just some of the benefits provided by the system and method described herein.

Those skilled in the relevant art will appreciate that the invention can be practiced with various telecommunications or computer system configurations, including Internet appliances, hand-held devices, wearable computers, palm-top computers, cellular or mobile phones, multi-processor systems, microprocessor-based or programmable consumer electronics, set-top boxes, network PCs, mini-computers, mainframe computers, and the like. Aspects of the invention can be embodied in a special purpose computer or data processor that is specifically programmed, configured, or constructed to perform one or more of the computer-executable instructions explained in detail herein. Indeed, the term "computer," as used generally herein, refers to any of the above devices, as well as to any data processor. Data structures and transmission of data particular to aspects of the invention are also encompassed within the scope of the invention. In general, while hardware platforms such as stationary and mobile devices are described herein, aspects of the invention are equally applicable to nodes on the network having corresponding resource locators to identify such nodes.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "above," "below," and words of similar import, when used in this application, shall refer to this application as a whole and not to any particular portions of this application. Use of the term "or," as used in this application with respect to a list of two or more items, shall be interpreted to cover any, all, or any combination of items in the list.

The above detailed descriptions of embodiments of the invention are not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. The teachings of the invention provided herein may be applied to other systems, not necessarily the system described herein. The various embodiments described herein can be combined to provide further embodiments. These and other changes can be made to the invention in light of the detailed description.

These and other changes can be made to the invention in light of the above detailed description. In general, the terms used in the following claims should not be construed to limit the invention to the specific embodiments disclosed in the specification, unless the above detailed description explicitly defines such terms. Accordingly, the actual scope of the invention encompasses the disclosed embodiments and all equivalent ways of practicing or implementing the invention under the claims.

While certain aspects of the invention are presented below in certain claim forms, the inventors contemplate the various aspects of the invention in any number of claim forms. Accordingly, the inventors reserve the right to add additional claims after filing the application to pursue such additional claim forms for other aspects of the invention.

We claim:

1. An apparatus comprising:
   two or more remote units, each remote unit comprising:
      a radio transceiver for communication with a base; and
      a memory module, wherein the memory module includes an indication of a
      combination of two or more tones, the combined tones representing an
      indication of an access request and a priority request; and
   a stationary base station of a fixed wireless network, the base comprising:
      a wireless transceiver for communicating with a publicly switched telephone network and the Internet;
      a radio transceiver for communicating with one or more remote units; a memory module; and
      a processor, the processor being adapted to receive the indication of an access request and a priority request from the two or more remote units, wherein the processor is further adapted to analyze the priority requests to determine which remote units will be granted access to an uplink channel, and wherein further the processor is adapted to transmit an indication of which remote units have been granted access to an uplink channel based in part on the priority request represented by the combined two or more tones.

2. The apparatus of claim 1 wherein indications of an access request and a priority request are combined in two OFDM tones; wherein further the base and remote units communicate via a collision-free multiple access protocol; and wherein further both the remote units and the base include a data medium access control layer for use in transmission.

3. A method of determining priority between two or more remote units requesting uplink access to a network, comprising:

receiving an access request from at least two remote units, wherein the access request is a request for uplink access to the network, and wherein the access request includes an identification of the remote unit;

receiving a priority request from the two remote units, wherein the access request and priority request are encompassed within a set of tones;

prioritizing the priority requests received from the remote units to determine which of the two remote units will be granted uplink access to the network;

based on the prioritizing, transmitting an indication signal to one of the two remote units, wherein the indication signal represents that the one indicated remote unit is allowed to transmit on an uplink channel.

4. The method of claim 3 wherein the tones encompassing the access request and priority request are OFDM tones.

5. The method of claim 3 wherein two tones encompass the access request and priority request.

6. The method of claim 3 wherein three tones encompass the access request and priority request.

7. The method of claim 3 wherein four tones encompass the access request and priority request.

8. The method of claim 3 wherein the priority request is based on the type of the remote unit.

9. The method of claim 3 wherein the priority request is based on a user device associated with the remote unit.

10. The method of claim 3 wherein the priority request is based on the type of application to which the transmitted signal is related.

11. The method of claim 3 wherein the priority request is based on a level of service associated with a user.

12. The method of claim 3 wherein the base and remote units communicate via a collision-free multiple access protocol.

13. The method of claim 3 further comprising creating queues for each level of priority.

14. The method of claim 3 wherein the highest priority access requests are placed ahead of all lower priority access requests in priority queues.

15. A method, for use at a remote unit, of requesting access to a network, comprising:

at the remote unit, transmitting an access request to a base, the access request including an identification of the remote unit, wherein the access request also includes a priority request, wherein the access request includes a set of tones that encompass the priority request, and wherein the base is coupled to the network and communicates wirelessly with at least a part of the remote unit;

at the remote unit, monitoring a communications channel to determine if the remote unit has been authorized to transmit information; and at the remote unit, if authorization is received, transmitting information to the base.

16. The method of claim 15 wherein the access request includes at least two OFDM tones.

17. The method of claim 15 wherein the access request includes two OFDM tones that convey the access and priority requests, and wherein further the priority requests allow for at least three levels of priority.

18. The method of claim 15 wherein the access request includes three or more OFDM tones that convey the access and priority requests.

19. The method of claim 15 wherein remote unit is a user device, the user device being coupled to another device that includes a wireless transceiver for communicating wirelessly with the base.

20. The method of claim 15 wherein remote unit is a facsimile machine, the facsimile machine being coupled to another device that includes a wireless transceiver for communicating wirelessly with the base.

21. The method of claim 15, further comprising:

at the remote unit, receiving an indication of a request for a transmission from one or more user devices, wherein the access request to the base is determined at least partially by the requests received from the one or more user devices.

22. The method of claim 15, further comprising:

at the remote unit, receiving an indication of a request for a transmission from one or more user devices, wherein the access request to the base is determined at least partially by the requests received from the one or more user devices; and accessing a lookup table to determine a level of priority for each of the one or more user devices.

23. A computer-readable medium whose contents cause control logic in a base to perform a method to determine priority between two or more remote units requesting uplink access to a network, comprising:

receiving an access request from at least two remote units in two or more tones, wherein the access request is a request for uplink access, the access request including an identification of the remote unit;

receiving a priority request from at least two of the remote units, wherein the two or more tones indicate an access request and a priority request;

prioritizing the access requests based on the received priority requests; and transmitting an indication of at least one remote unit that is allowed to transmit on an uplink channel.

24. An apparatus for prioritizing access requests from a plurality of remote units comprising:

means for receiving an access request from at least two remote units, wherein the access request is a request for uplink access, the access request including a priority request, wherein the access request and priority request are included within two or more tones;

means for analyzing the priority requests received from the remote units to determine which remote units will be granted uplink access to the network;

means for prioritizing the access requests; and means for transmitting an indication of at least one remote unit that is allowed to transmit.

25. A computer-readable medium containing a data structure for use by a fixed wireless network, the data structure comprising:
  an indication of an access request by a remote unit; and
  an indication of a priority request by a remote unit, wherein the indication of the access request and the indication of the priority request are included within two or more tones, wherein further the data structure is used with a collision-free multiple access protocol.

26. The computer-readable medium of claim 25 further comprising an identification of the remote unit.

27. The computer-readable medium of claim 25 wherein there are two OFDM tones.

28. The computer-readable medium of claim 25 wherein there are three or more OFDM tones.

* * * * *